V. D. WHITE.
ATTACHMENT FOR AUTOMOBILES.
APPLICATION FILED MAR. 27, 1917.

1,245,293. Patented Nov. 6, 1917.

Inventor
V. D. White,
By C. A. Snow & Co.
Attorney

Witness

UNITED STATES PATENT OFFICE.

VIRGIL D. WHITE, OF WEST OSSIPEE, NEW HAMPSHIRE.

ATTACHMENT FOR AUTOMOBILES.

1,245,293.  Specification of Letters Patent.  Patented Nov. 6, 1917.

Application filed March 27, 1917. Serial No. 157,789.

*To all whom it may concern:*

Be it known that I, VIRGIL D. WHITE, a citizen of the United States, residing at West Ossipee, in the county of Carroll and State of New Hampshire, have invented a new and useful Attachment for Automobiles, of which the following is a specification.

The device forming the subject matter of this application is adapted to be assembled with the wheels of a vehicle, for the purpose of increasing the tractive effort, the structure being of peculiar utility in connection with motor sleighs and the like, embodying a forward sled and a pair of rear wheels, although the invention is not confined to the use above specified.

The invention aims to provide, in a structure of the sort above mentioned, a novel form of bracket adapted to coöperate with the tires of a pair of wheels, and to improve the connection between the bracket, the belt which connects a plurality of the brackets, and traction cleats which are carried by the belt.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—

In the accompanying drawings, there is shown a plurality of brackets each comprising an arcuate seat 1, a base 2, a pedestal 3 connecting the intermediate portion of the seat 1 with the intermediate portion of the base 2, and downwardly and outwardly inclined braces 4 connecting the ends of the seat 1 with the ends of the base 2. The seat 1 preferably is somewhat narrower than the base 2 and the edges of the braces 4 converge as shown at 5 from the base 2 toward the ends of the seat 1.

Figure 1:
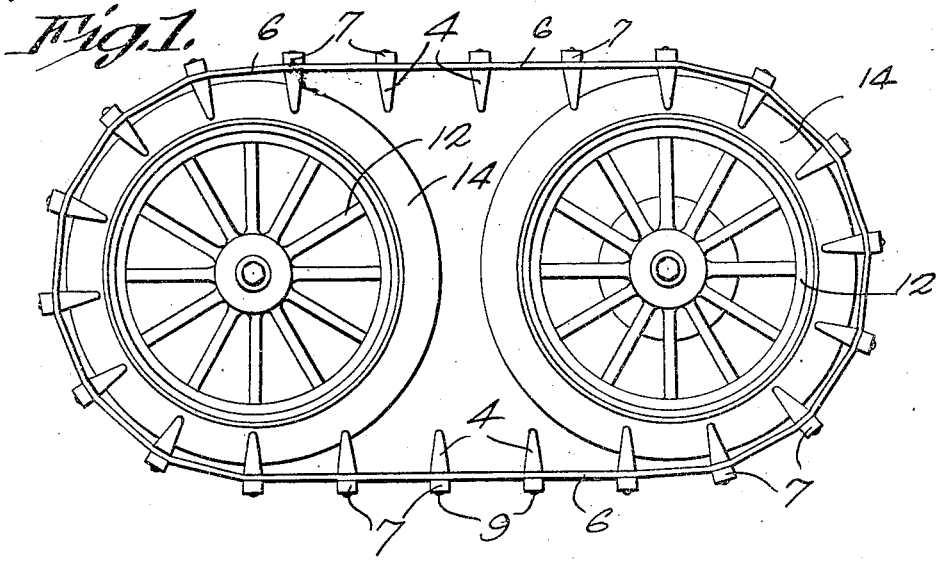
Figure 1 shows in side elevation, a device constructed in accordance with the present invention, the same being assembled with a pair of wheels.
Figure 2:
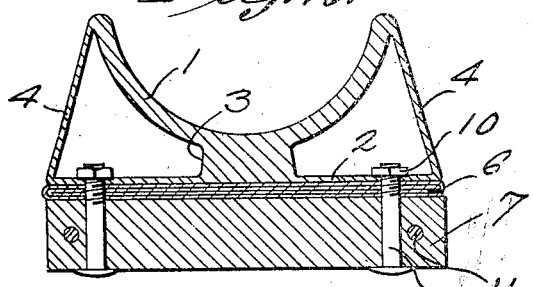
Fig. 2 is a transverse section taken through the belt, one of the brackets, and one of the cleats, parts appearing in elevation; and, Fig. 3 is a top plan of the structure shown in Fig. 2.
Figure 3:
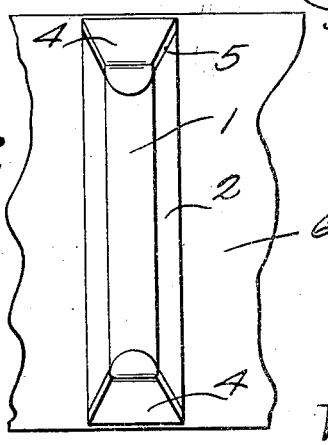

A plurality of brackets, constructed as above described, are applied to the inner face of a belt 6, which, as indicated in Fig. 2, may consist of a strip of canvas rolled upon itself and flattened down, the constituent layers of the belt being cemented or otherwise secured together to form a strong and compact structure. Disposed upon the outer face of the belt 6 are traction cleats 7. Connecting devices 9 which may be bolts, pass through the cleats 7, through the belt 6 and through the base 2 of the bracket on each side of the pedestal 3. Nuts 10 are threaded onto the inner ends of the bolts 9 and engage the base 2. If desired, reinforcing elements, which may be bolts 11, may be passed through the cleats 7, on the outer sides of the bolts 9, to prevent the cleats from splitting.

The numeral 12 indicates wheels provided with tires 14. In practical operation, the belt 6 is disposed about the wheels 12, the seats 1 being shaped to correspond with the transverse section of the tires 14. The cleats enable the structure to have a secure and firm hold on the tires 14 without injuring the tires, and it is obvious that if one or both of the wheels 14 be power driven, the cleats 7 will exert an important tractive effort on the ground and enable the structure to be used efficiently on snow, slush or ice.

Having thus described the invention, what is claimed is:—

1. In a device of the class described, a belt; brackets applied to the inner side of the belt, each bracket including a base engaging the belt, an arcuate seat, a pedestal connecting the intermediate portion of the base with the intermediate portion of the seat, and outwardly inclined braces connecting the ends of the seat with the ends of the base; traction cleats applied to the outer face of the belt; and securing devices passing through the cleats and the belt, the securing devices engaging the bases of the brackets, on opposite sides of the pedestals.

2. In a device of the class described, a belt; brackets applied to the inner face of the belt, each bracket including a base engaging the belt, an arcuate seat, a pedestal connecting the intermediate portion of the seat with the intermediate portion of the base, and braces connecting the ends of the seat with the ends of the base; traction cleats applied to the outer face of the belt; securing devices passing through the cleats and the belt and engaging the base on opposite sides of the pedestal; and reinforcing members disposed substantially at right angles to the securing devices and passing through the cleats adjacent the ends of the cleats.

In testimony that I claim the foregoing as my own, I have hereto affixed my signature in the presence of two witnesses.

VIRGIL D. WHITE.

Witnesses:
 CHARLES W. WHITE,
 EVA C. COBURN.